US012692745B2

(12) United States Patent
Ehrlich

(10) Patent No.: US 12,692,745 B2
(45) Date of Patent: Jul. 28, 2026

(54) METHODS AND SYSTEMS FOR CONVERTING OFFICE BUILDINGS INTO RESIDENTIAL USE

(71) Applicant: Gal Ehrlich, Tel-Aviv (IL)

(72) Inventor: Gal Ehrlich, Tel-Aviv (IL)

( * ) Notice: Subject to any disclaimer, the term of this patent is extended or adjusted under 35 U.S.C. 154(b) by 0 days.

(21) Appl. No.: 19/328,299

(22) Filed: Sep. 15, 2025

(65) Prior Publication Data

US 2026/0098446 A1 Apr. 9, 2026

Related U.S. Application Data

(63) Continuation of application No. PCT/IL2025/050585, filed on Jul. 8, 2025, which is a continuation-in-part of application No. 19/221,577, filed on May 29, 2025, and a continuation-in-part of application No. 18/921,085, filed on Oct. 21, 2024, now abandoned, and a continuation of application No. 18/910,097, filed on Oct. 9, 2024, now abandoned.

(51) Int. Cl.

| | |
|---|---|
| ***E06B 9/68*** | (2006.01) |
| ***E06B 9/28*** | (2006.01) |
| ***E06B 9/36*** | (2006.01) |
| *E06B 9/24* | (2006.01) |

(52) U.S. Cl.

CPC .................. *E06B 9/68* (2013.01); *E06B 9/28* (2013.01); *E06B 9/36* (2013.01); *E06B 2009/2423* (2013.01); *E06B 2009/2464* (2013.01); *E06B 2009/2476* (2013.01); *E06B 2009/6827* (2013.01)

(58) Field of Classification Search

None

See application file for complete search history.

(56) References Cited

U.S. PATENT DOCUMENTS

| | | | | |
|---|---|---|---|---|
| 2,339,778 A | | 1/1944 | Groeniger | |
| 2,562,050 A | | 7/1951 | Lankton | |
| 2,927,599 A | * | 3/1960 | Stetson .................. | E03C 1/122<br>52/234 |
| 3,601,937 A | | 8/1971 | Campbell | |

(Continued)

FOREIGN PATENT DOCUMENTS

| | | | | |
|---|---|---|---|---|
| CN | 111677062 | | 9/2020 | |
| CN | 111677062 A | * | 9/2020 | ............. E03C 1/122 |

(Continued)

OTHER PUBLICATIONS

Jul. 14, 2023 The conversation Empty office spaces can be converted to residential building.pdf.*

(Continued)

*Primary Examiner* — Babajide A Demuren

(57) ABSTRACT

A method and system for converting an office building into residential use by enhancing water supply and wastewater management capabilities. Vertical water supply lines and vertical wastewater pipes are installed within a pre-existing elevator shaft to increase supply and disposal capacities. Floor-level water distribution systems supply water to residential units from the vertical water supply lines, while floor-level wastewater collectors receive wastewater, which is then pumped to the vertical wastewater pipes.

20 Claims, 9 Drawing Sheets

(56) References Cited

U.S. PATENT DOCUMENTS

| | | | | |
|---|---|---|---|---|
| 5,032,290 | A | 7/1991 | Yamagata et al. | |
| 8,213,074 | B1 | 7/2012 | Shrivastava et al. | |
| 11,656,521 | B2 | 5/2023 | Tinianov et al. | |
| 2011/0167741 | A1 | 7/2011 | Surace et al. | |
| 2012/0180957 | A1 | 7/2012 | Svirsky | |
| 2013/0192770 | A1 | 8/2013 | Murphy, Jr. et al. | |
| 2014/0288715 | A1 | 9/2014 | Beaujeu et al. | |
| 2017/0328121 | A1* | 11/2017 | Purdy | E06B 3/677 |
| 2019/0252565 | A1 | 8/2019 | Lyons | |
| 2021/0340813 | A1 | 11/2021 | Mohammadikashkooli et al. | |
| 2022/0137476 | A1 | 5/2022 | Trikha et al. | |
| 2022/0349183 | A1 | 11/2022 | Kalinowski | |
| 2022/0365494 | A1 | 11/2022 | Shrivastava et al. | |
| 2023/0208346 | A1 | 6/2023 | Davy | |
| 2024/0338000 | A1 | 10/2024 | Couillard et al. | |

FOREIGN PATENT DOCUMENTS

| | | | | |
|---|---|---|---|---|
| CN | 215062928 | U * | 12/2021 | |
| CN | 218028731 | U * | 12/2022 | |
| CN | 218028731 | | 12/2025 | |
| DE | 102021110938 | | 11/2022 | |
| JP | 2003-184330 | | 7/2003 | |
| KR | 20170137718 | A * | 12/2017 | B65G 1/0464 |
| SE | 532282 | | 12/2009 | |
| WO | WO 2011/061467 | | 5/2011 | |
| WO | WO-2020161548 | A2 * | 8/2020 | H02S 40/44 |

OTHER PUBLICATIONS

Official Action Dated Dec. 2, 2024 From the US Patent and Trademark Office Re. U.S. Appl. No. 18/910,097. (10 Pages).

Official Action Dated Jan. 13, 2025 From the US Patent and Trademark Office Re. U.S. Appl. No. 18/921,085. (8 Pages).

Restriction Official Action Dated Dec. 6, 2024 From the US Patent and Trademark Office Re. U.S. Appl. No. 18/921,085. (11 Pages).

Invitation to Pay Additional Fees and Communication Relating to the Results of the Partial International Search Dated Dec. 1, 2025 From the International Searching Authority Re. Application No. PCT/IL2025/050585. (6 Pages).

Brooks "Liberty Elevator—Elevator Modernization During Office-to-Residential Conversion", Liberty Elevator Corporation, XP093320858, p. 1-4, May 28, 2024.

Kabel Eins "Vom Büro zur Wohnung: Chancen und Probleme der Umnutzung [From Office to Apartment: Opportunities and Problems of Conversion]", K1 Magazin, XP093320869, YouTube, 1 P., May 19, 2024.

Middleton et al. "Wohnraum Schaffen Durch Umnutzung von Büroflächen [Creating Living Space Through the Conversion of Office Space]", Kinzo, PWC, Die Stadtretter, XP093320828, p. 1-10, Sep. 27, 2023.

International Search Report and the Written Opinion Dated Feb. 24, 2026 From the International Searching Authority Re. Application No. PCT/IL2025/050585 (20 Pages).

* cited by examiner

METHODS AND SYSTEMS FOR CONVERTING OFFICE BUILDINGS INTO RESIDENTIAL USE

RELATED APPLICATIONS

This application is a Continuation of PCT Patent Application No. PCT/IL2025/050585 having International filing date of Jul. 8, 2025, which is a Continuation-in-Part (CIP) of U.S. patent application Ser. No. 19/221,577 filed on May 29, 2025, which is a Continuation of U.S. patent application Ser. No. 18/910,097 filed on Oct. 9, 2024, now abandoned. PCT Patent Application No. PCT/IL2025/050585 is also a Continuation-in-Part (CIP) of U.S. patent application Ser. No. 18/921,085 filed on Oct. 21, 2024, now abandoned. The contents of the above applications are all incorporated by reference as if fully set forth herein in their entirety.

FIELD OF THE INVENTION

The present invention relates generally to building retrofitting methods and systems, and more particularly to methods and systems for converting office buildings into residential use by enhancing water supply and wastewater disposal capacities. This enhancement is achieved by utilizing existing elevator shafts for installing vertical water supply lines and vertical wastewater pipes, integrating floor-level water distribution systems and wastewater collectors with pumps, among other features.

BACKGROUND OF THE INVENTION

Urbanization has led to a significant increase in demand for residential spaces in urban areas worldwide. Simultaneously, changes in work patterns, such as the rise of remote work, flexible scheduling, and advancements in digital communication technologies, have resulted in underutilization of many office buildings. These vacant or partially occupied office buildings represent a substantial opportunity for conversion into residential units, addressing housing shortages, reducing urban sprawl, and revitalizing urban environments.

However, converting office buildings into residential spaces poses several challenges. Office buildings are typically designed with infrastructure optimized for business operations, which includes lower water usage and wastewater generation compared to residential needs. The existing water supply systems and vertical wastewater disposal systems are often insufficient in capacity and design for residential requirements. Residential units require more extensive plumbing systems to handle activities such as bathing, cooking, laundry, and sanitation, which significantly increase water consumption and wastewater production.

Moreover, office buildings may lack the necessary vertical shafts or space to install additional plumbing without significant structural modifications. Upgrading the water supply and wastewater management systems in office buildings is complex and costly. Traditional methods involve substantial structural modifications, such as installing new vertical shafts, enlarging existing plumbing chases, or reconfiguring floor layouts, which can be impractical and uneconomical. These renovations can also cause significant disruptions to the building's operation and occupancy during construction, leading to additional costs and logistical challenges.

Furthermore, modern residential buildings require additional amenities and systems, including advanced HVAC systems, increased electrical capacity, communication networks, and compliance with stricter building codes related to safety, accessibility, and environmental standards. Retrofitting office buildings to meet these requirements without extensive structural changes presents a significant engineering and architectural challenge.

Therefore, there is a need for efficient, cost-effective methods to separately enhance both the water supply and wastewater management systems, along with other infrastructural elements, in office buildings being converted into residential units. The methods should minimize structural changes by utilizing existing building features, such as elevator shafts, and incorporate additional systems to meet modern residential needs while ensuring compliance with building codes and regulations.

SUMMARY OF THE INVENTION

According to an aspect of the invention, there is provided a method for converting a multi-story office building into a multi-story residential building, the office building having a vertical and continuous internal core, at least a part of or the entire the internal core is load-bearing of the building, the internal core housing:

(i) a plurality of elevators, each in a pre-existing elevator shaft;
(ii) a pre-existing vertical fresh water pipe; and
(iii) a pre-existing vertical waste water pipe;

the method comprising:

(a) repurposing at least one the pre-existing elevator shafts in the internal core, by removing at least one the elevators from within the at least one the pre-existing elevator shafts, so as to generate at least one elevator-free elevator shafts, and vertically installing, within the at least one elevator-free elevator shafts at least one augmenting fresh water pipe and/or augmenting waste water pipe, so as to increase a residential capacity of the multi-story office building, wherein the multi-story residential building comprises at least one additional pre-existing elevator shafts in the internal core which houses at least one operational elevator, wherein a majority of floors of the office building are converted into a plurality of residential units.

According to embodiments of the invention, the method further comprises vertically installing, within an additional pre-existing shaft of the internal core at least one additional augmenting fresh water pipe and/or additional augmenting waste water pipe.

According to embodiments of the invention, the internal core further houses a pre-existing installation selected from the group consisting of air ventilation pipes and systems, air conditioning pipes, air tunnels and systems, electricity lines and panels, data lines and waste water ventilation pipes.

According to embodiments of the invention, the method further comprises installing within the at least one elevator-free elevator shaft and/or the additional pre-existing shaft at least one augmenting the installation.

According to embodiments of the invention, the method further comprises installing a plurality of floor-level wastewater collectors; each the plurality of floor-level wastewater collectors configured for gravitationally collecting wastewater from the residential units of any of the floor levels and transferring the wastewater from the floor-level wastewater collectors to the vertical wastewater pipes by a plurality of pumps.

According to embodiments of the invention, the pumps are located in the pre-existing elevator-free elevator shaft.

According to embodiments of the invention, the method further comprises configuring at least one the residential unit on each floor such that water is supplied to the residential unit from a floor-level water distribution system connected to the vertical fresh water pipe in the at least one elevator-free elevator shaft.

According to embodiments of the invention, noise reduction materials are applied around the vertical wastewater pipes and pumps to minimize sound transmission.

According to embodiments of the invention, noise reduction materials are applied onto the pumps to minimize sound transmission.

According to embodiments of the invention, the method further comprises adjusting a schedule of the at least one operational elevator in the residential building to compensate for the repurposed pre-existing elevator free elevator shaft.

According to embodiments of the invention, the at least one elevator-free elevator shafts is further utilized to house wastewater vent pipes extending to the rooftop of the building.

According to embodiments of the invention, the at least one elevator-free elevator shafts is further utilized to house vertical air conditioning components servicing the residential units.

According to embodiments of the invention, leakage control systems are implemented to detect and contain any leakage from the augmenting wastewater pipes or the augmenting fresh water pipes.

According to embodiments of the invention, the augmenting wastewater pipes and augmenting fresh water pipes comprise noise reduction materials to minimize sound transmission to residential units.

According to embodiments of the invention, the method further comprises integrating the building's HVAC system with air conditioning components installed in the repurposed elevator shaft.

According to embodiments of the invention, the method further comprises installing backup power systems for the pumps.

According to embodiments of the invention, the method further comprises structurally reinforcing the elevator-free elevator shaft to support the additional systems installed.

According to embodiments of the invention, the pumps are equipped with emergency manual override controls.

According to embodiments of the invention, the leakage control system is connected to the residential building's main alarm panel for centralized alerts.

According to embodiments of the invention, the residential building comprises at least two additional centrally located pre-existing elevator shafts, each housing an operational elevator, which are equipped with improved scheduling software to reduce wait times due to decrease elevator availability and the converting of the office building.

According to embodiments of the invention, communication cables including provisions for smart home integration systems are fitted within the residential units, whereas the at least one elevator-free elevator shaft includes access points on each floor for maintenance of the installed systems.

According to embodiments of the invention, the vent pipes in the at least one elevator free elevator shaft are equipped with backflow prevention devices.

According to an aspect of the invention, there is provided a method of partitioning at least one story of a multi-story office building into a plurality of residential units, wherein the multi-story office building has a vertical and continuous internal core, at least a part of or the entire the internal core is load-bearing of the building, the internal core having vertically placed wastewater pipes, each of the plurality of residential units having at least one wastewater generation location located outside the internal core, the method comprising:

installing a plurality of floor-level wastewater collectors in the at least one story, between the internal core and the at least one wastewater generation location, each the plurality of floor-level wastewater collectors being configured for gravitationally collecting wastewater from the at least one wastewater generation location of the residential units and transferring the wastewater from the floor-level wastewater collectors to the wastewater pipes by a plurality of pumps, thereby allowing to maximize the inner floor height.

According to embodiments of the invention, the multi-story office building houses a plurality of elevators, each in a pre-existing elevator shaft, in the internal core, the method further comprising repurposing at least one the pre-existing elevator shaft in the internal core, by removing at least one elevator from within at least one the pre-existing elevator shaft, so as to generate at least one elevator-free elevator shaft, and vertically installing, within the at least one elevator free elevator shaft, augmenting wastewater pipes, so as to increase a capacity of waste water removal.

According to embodiments of the invention, the method further comprises vertically installing within the at least one elevator free elevator shaft at least one augmenting installation and/or system selected from the group consisting of augmenting air ventilation pipes, augmenting air ventilation systems, augmenting air conditioning pipes, augmenting air conditioning air tunnels, augmenting air conditioning systems, augmenting electricity lines, augmenting data lines, augmenting electricity panels, augmenting fresh water pipes, augmenting waste water ventilation pipes, so as to increase the capacity thereof.

According to embodiments of the invention, at least 80% of the outer façade of the building is fabricated from glass.

According to embodiments of the invention, the multi-story building is at least five stories high.

According to embodiments of the invention, the floor area of the building is greater than 300 square meter.

According to embodiments of the invention, the floor area of the building is greater than 1,000 square meter.

According to embodiments of the invention, the method further comprises installing sun-shielding elements on the facade of the building, wherein the sun-shielding elements are controllable by occupants of each the residential unit to selectively allow or block sunlight entering their respective units.

According to embodiments of the invention, the sun-shielding elements comprise darkening glass panels that adjust transparency in response to control signals from residents of the building.

According to embodiments of the invention, the sun-shielding elements comprise blinds installed on the facade, operable to adjust the amount of sunlight entering the residential units.

According to embodiments of the invention, the blinds are vertical blinds controllable by the residents of the building.

According to embodiments of the invention, the blinds are horizontal blinds controllable by the residents of the building.

According to embodiments of the invention, the blinds are motorized and integrated with a control interface within each the at least one residential unit.

According to embodiments of the invention, the sun-shielding elements are designed to contribute to the decorative appearance of the building facade.

According to embodiments of the invention, the method further comprises integrating the sun-shielding elements with an automated building management system to control sunlight exposure based on environmental conditions.

According to embodiments of the invention, the sun-shielding elements include a combination of darkening glass and adjustable blinds.

According to embodiments of the invention, the darkening glass panels are electrochromic glass that changes transparency upon application of an electric voltage.

According to embodiments of the invention, the sun-shielding elements provide thermal insulation to the at least one residential unit.

According to embodiments of the invention, the method further comprises installing individual control interfaces within each the at least one residential unit to operate the sun-shielding elements.

According to embodiments of the invention, the sun-shielding elements are installed over existing windows of the building facade.

According to embodiments of the invention, the sun-shielding elements comprise external shading devices attached to the facade.

According to embodiments of the invention, the external shading devices are adjustable louvers controllable by the occupants.

According to embodiments of the invention, the sun-shielding elements are programmable to automatically adjust based on the time of day.

According to embodiments of the invention, the method further comprises integrating sensors to detect sunlight intensity and adjust the sun-shielding elements accordingly.

According to embodiments of the invention, the sun-shielding elements include smart glass technology responsive to electrical, thermal, or optical stimuli.

According to embodiments of the invention, the method further comprises providing remote control capabilities for the sun-shielding elements via mobile devices.

According to embodiments of the invention, the sun-shielding elements are designed to improve the energy efficiency of the building by reducing cooling loads.

According to embodiments of the invention, the sun-shielding elements integrate photovoltaic cells to assist in energy supply to the building while blocking sunlight when needed.

According to embodiments of the invention, the photovoltaic cells are integrated into the surface of the sun-shielding elements.

According to embodiments of the invention, the photovoltaic cells are installed adjacent to the sun-shielding elements on the facade.

According to embodiments of the invention, the method further comprises integrating the photovoltaic cells with the building's electrical system to supply generated electricity.

According to embodiments of the invention, the photovoltaic cells are thin-film solar cells embedded within the sun-shielding elements.

According to embodiments of the invention, the sun-shielding elements comprise adjustable louvers with photovoltaic cells mounted on their surfaces.

According to embodiments of the invention, the photovoltaic cells contribute to reducing the building's overall energy consumption from the grid.

According to embodiments of the invention, the method further comprises an energy management system to monitor and control the electricity generated by the photovoltaic cells.

According to embodiments of the invention, the integration of photovoltaic cells enhances the aesthetic appearance of the building facade.

According to embodiments of the invention, the photovoltaic cells are designed to allow partial light transmission.

According to an aspect of the invention, there is provided a residential building converted from an office building as described herein.

BRIEF DESCRIPTION OF THE SEVERAL VIEWS OF THE DRAWING(S)

Figure 8:
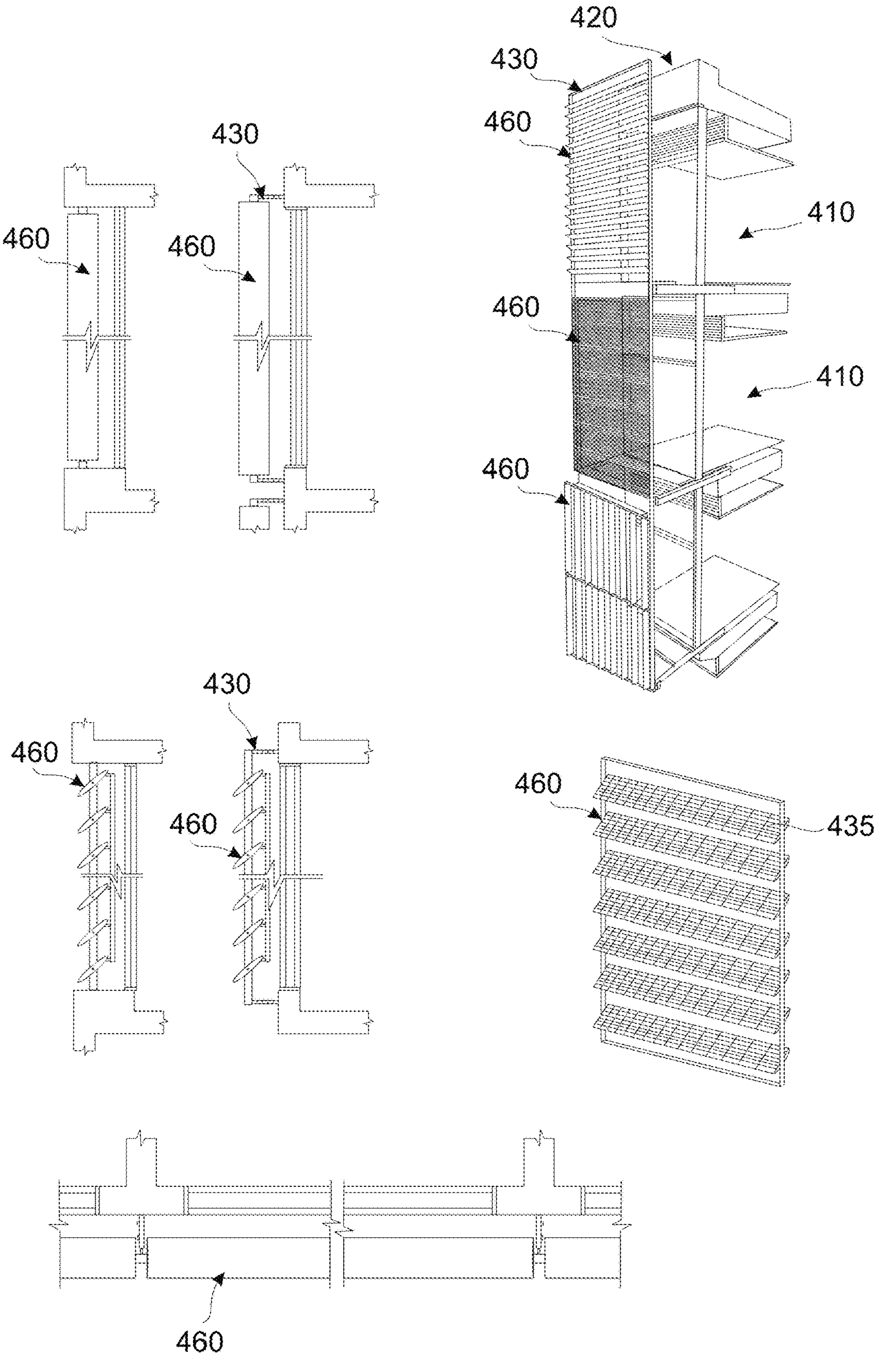

FIG. 8 presents a detailed view of external adjustable louvers with integrated photovoltaic cells attached to the building façade.

Figure 9:
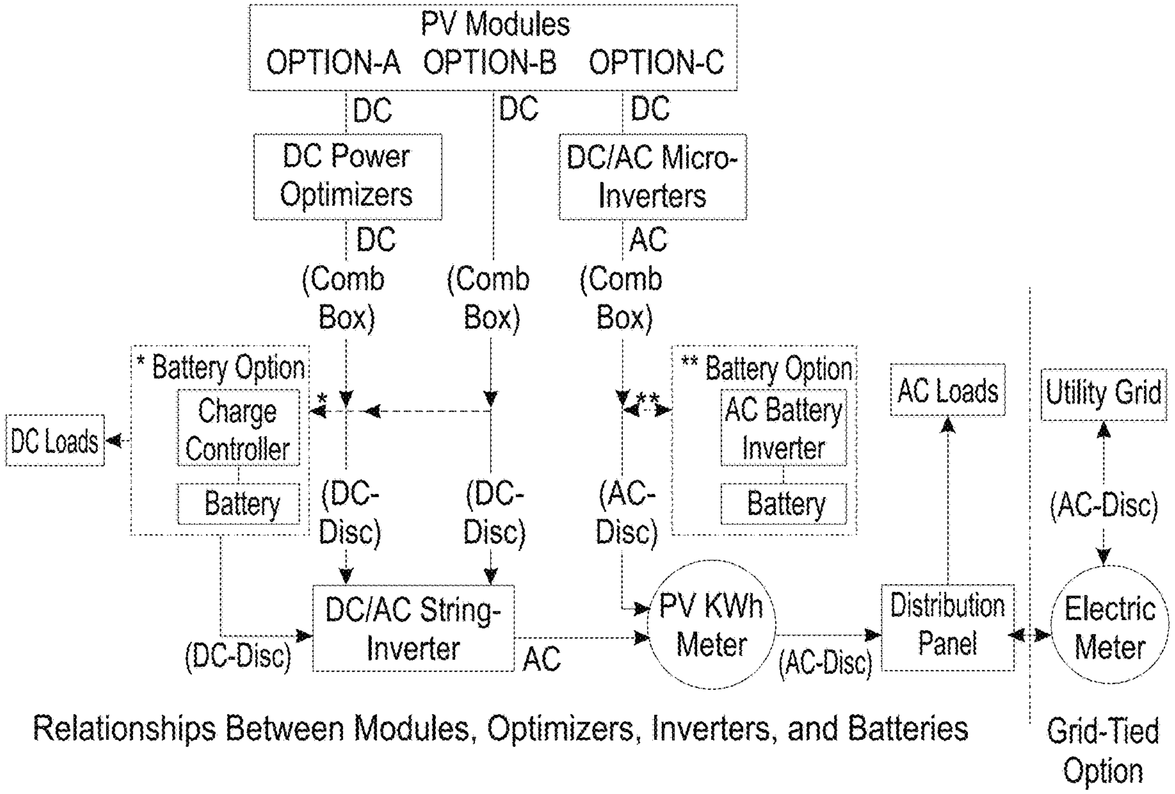
Figure 9:
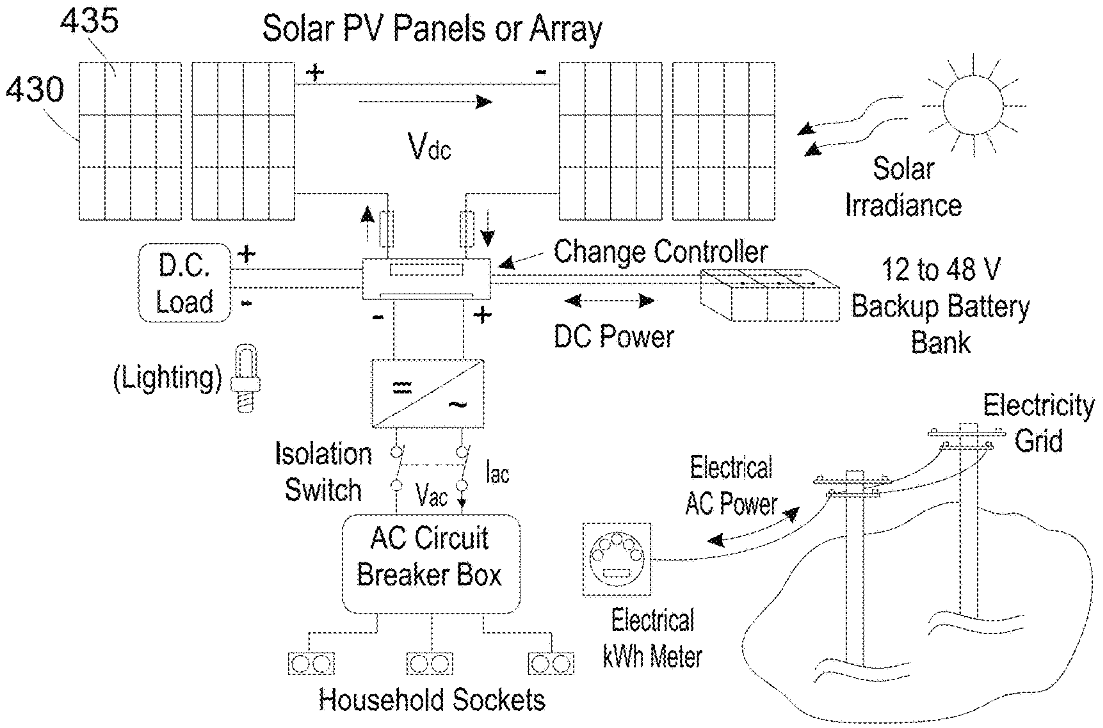

FIG. 9 illustrates the electrical integration of photovoltaic cells into the building's energy supply system.

DESCRIPTION OF SPECIFIC EMBODIMENTS OF THE INVENTION

The present invention relates generally to building retrofitting methods and systems, and more particularly to methods and systems for converting office buildings into residential use by separately enhancing water supply and wastewater disposal capacities. This enhancement is achieved by utilizing pre-existing elevator shafts for installing vertical water supply lines and vertical wastewater pipes, integrating floor-level water distribution systems and wastewater collectors with pumps, among other features.

Before explaining at least one embodiment of the invention in detail, it is to be understood that the invention is not necessarily limited in its application to the details set forth in the following description or exemplified by the Examples. The invention is capable of other embodiments or of being practiced or carried out in various ways.

According to one aspect of the present invention, there is provided a method for converting a multi-story office building into a multi-story residential building, the office building having a vertical and continuous internal core, at least a part of (or the entire) internal core is load-bearing of the building, the internal core housing:

(i) a plurality of elevators, each in a pre-existing elevator shaft;
(ii) a pre-existing vertical fresh water pipe; and
(iii) a pre-existing vertical waste water pipe;

the method comprising:

(a) repurposing at least one of the pre-existing elevator shafts in the internal core, by removing at least one of the elevators from within the at least one pre-existing elevator shafts, so as to generate at least one elevator-free elevator shafts, and vertically installing, within the at least one elevator-free elevator shafts at least one augmenting fresh water pipe and/or augmenting waste water pipe, so as to increase a residential capacity of the multi-story office building, wherein the multi-story residential building comprises at least one additional pre-existing elevator shafts in the internal core which houses at least one operational elevator, wherein a majority of floors of the office building are converted into a plurality of residential units.

According to this aspect of the invention, an increase in residential capacity is effected by incorporating additional vertical stacks of wastewater and fresh water piping in preexisting shafts of the building. This enables the creation of more independently functioning residential units within the same building footprint, each optionally with its own bathroom(s) and water supply, without overloading existing infrastructure. The number of plumbing fixtures which are not present in the core may be increased by more than 50%, 100%, 200% or more.

The office building which is being repurposed is a multi-story building, typically comprising more than 5 floors, more than 10 floors or even more than 20 floors. The floor area of the office building is greater than 300 $m^2$, greater than 500 $m^2$, greater than 700 $m^2$, greater than 1000 $m^2$, greater than 1500 $m^2$, greater than 2000 $m^2$. According to a particular embodiment, at least 70%, 80%, 90% or more of the outer surface of the office building is made from glass.

The office building which is being repurposed has at least one (optionally two, or more) vertically continuous internal (i.e. inner) core structure. In one embodiment, at least a part of the internal core is load-bearing of the building. In other embodiments, at least 50%, 60%, 70%, 80%, 90% or even 100% of the internal core is load bearing.

The inner core is a vertically continuous core extending from the bottom of the building to the top of the building. The inner core provides rigidity to the building and resists lateral forces like wind and seismic loads. Typically, the inner core is fabricated from reinforced concrete or steel-reinforced concrete.

Figure 1A:
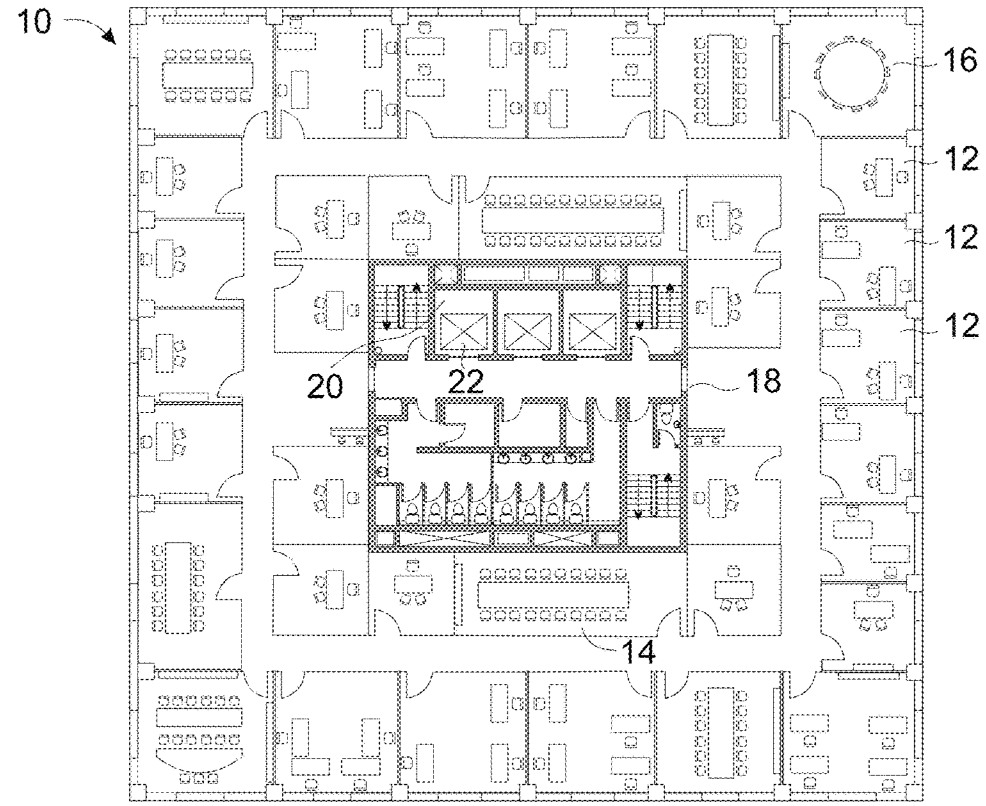
FIG. 1A is a plan view of an office building floor prior to retrofitting.
Figure 2A:
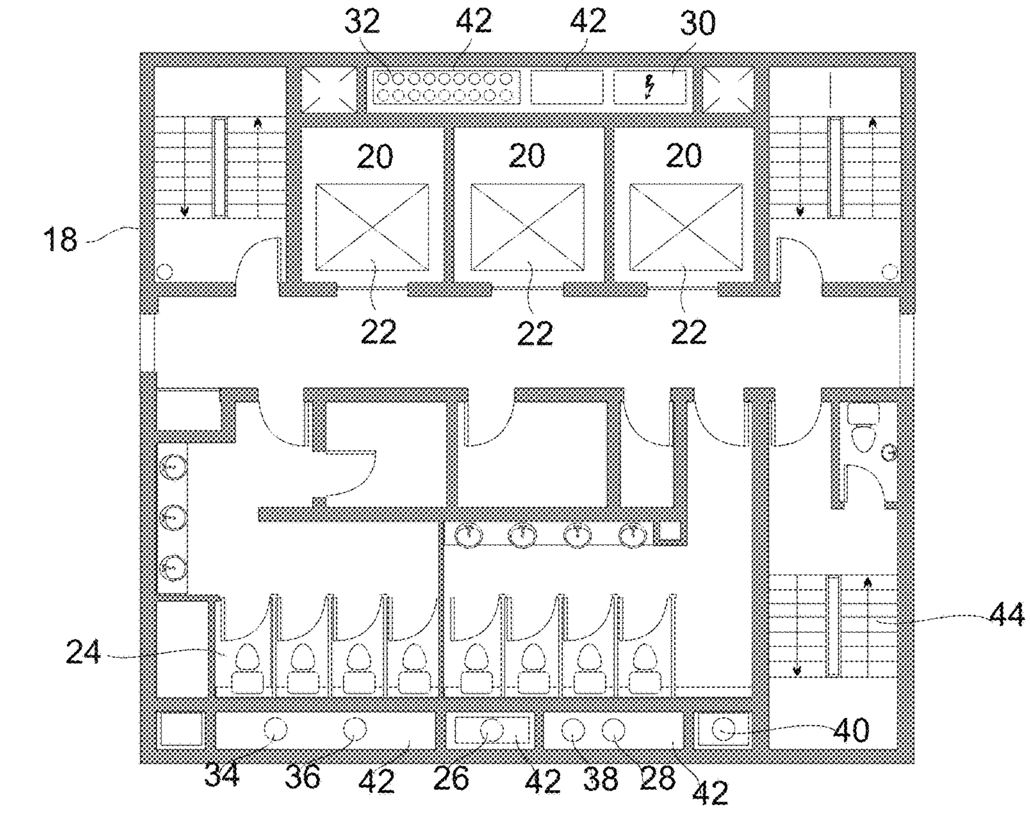
FIG. 2A is a plan view of an inner core of an office building floor prior to retrofitting.

An exemplary floor 10 of such an office building is shown in FIG. 1A. In this embodiment, floor 10 comprises individual offices 12, optional board rooms 14 and eating areas 16, surrounding at least one inner core 18 (marked by a heavy line). Inner core 18 comprises elevator shafts 20 and functioning elevators 22. A blow-up of the inner core of FIG. 1A is provided in FIG. 2A, in which further details are portrayed. The inner core 18 of the original office building houses at least two elevator shafts 20 (three are shown in FIG. 2A), functioning elevators 22 and further houses shafts 42 comprising vertical fresh water pipes 26 and waste water pipes 28. Optionally, the inner core 18 also houses toilets and restrooms 24, electrical cables 30, communication/data cables 32, air conditioning pipes 34, air ventilation pipes 36, waste water ventilation pipe 38 and air tunnel 40. Typically, the electrical cables 30 and communication/data 32 are not located in the same shafts as the water pipes 26 and 28. Optionally, inner core 18 also houses stairwells 44.

In order to convert the multi-story office building into a residential building, at least one of the pre-existing elevators 22 is removed from the elevator shaft 20 creating space for installation of an augmenting fresh water pipe and/or waste water pipe, as further described below. By doing so, the residential capacity is increased.

Removing elevators from shafts and repurposing of the shafts reduces retrofit cost since by doing so, it minimizes impact on existing floor structures and ensures vertical alignment of installations (such as fresh water and waste water pipes) without major floorplate disruption.

The repurposed residential building includes multiple floors 100, each floor housing at least one, two, three or more residential units 102 surrounding inner core 104.

Figure 1B:
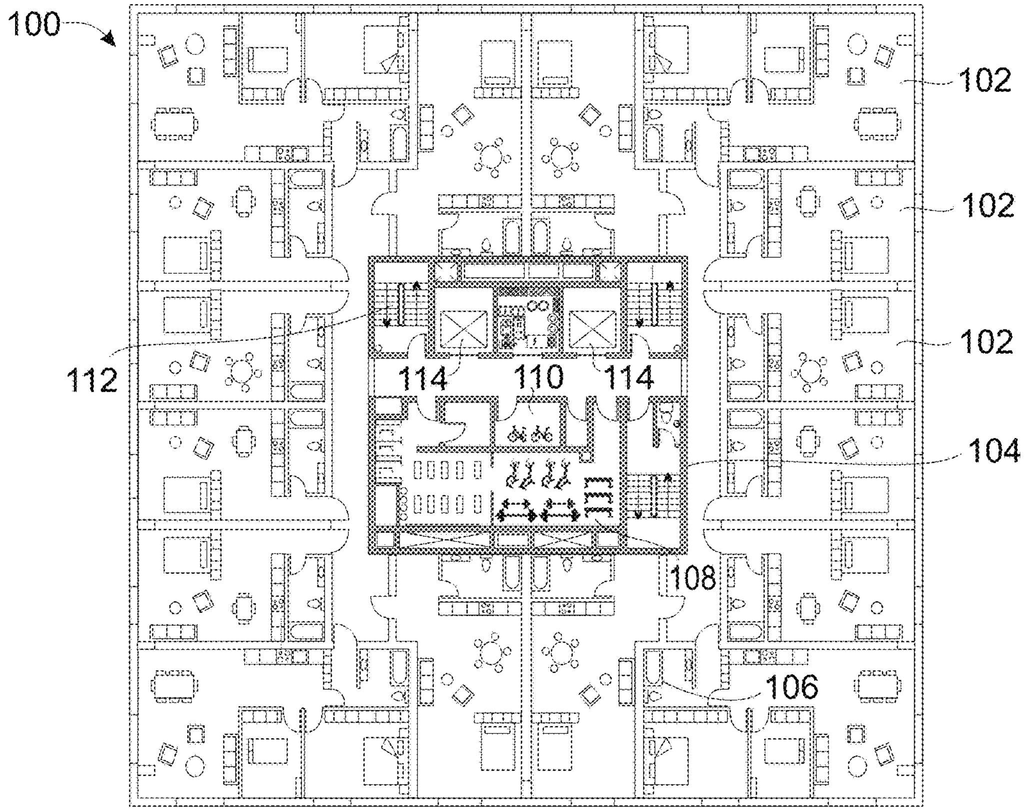
FIG. 1B is a plan view of a residential building floor following retrofitting of the office floor.

An exemplary floor 100 of a repurposed residential building is shown in FIG. 1B. The exemplary floor 100 comprises residential units 102 surrounding inner core 104, illustrated with a bold line. Each individual residential unit 102 comprises at least one bathroom/toilet 106. In one embodiment, at least some of the toilets/bathrooms 24 which were present in inner core 18 of office floor 10 are removed and no longer are present in residential floor 100. Converted inner core 104 may also comprise a gym 108, a bike storage facility 110, stairwell 112 and at least two functional elevators 114.

Figure 2B:
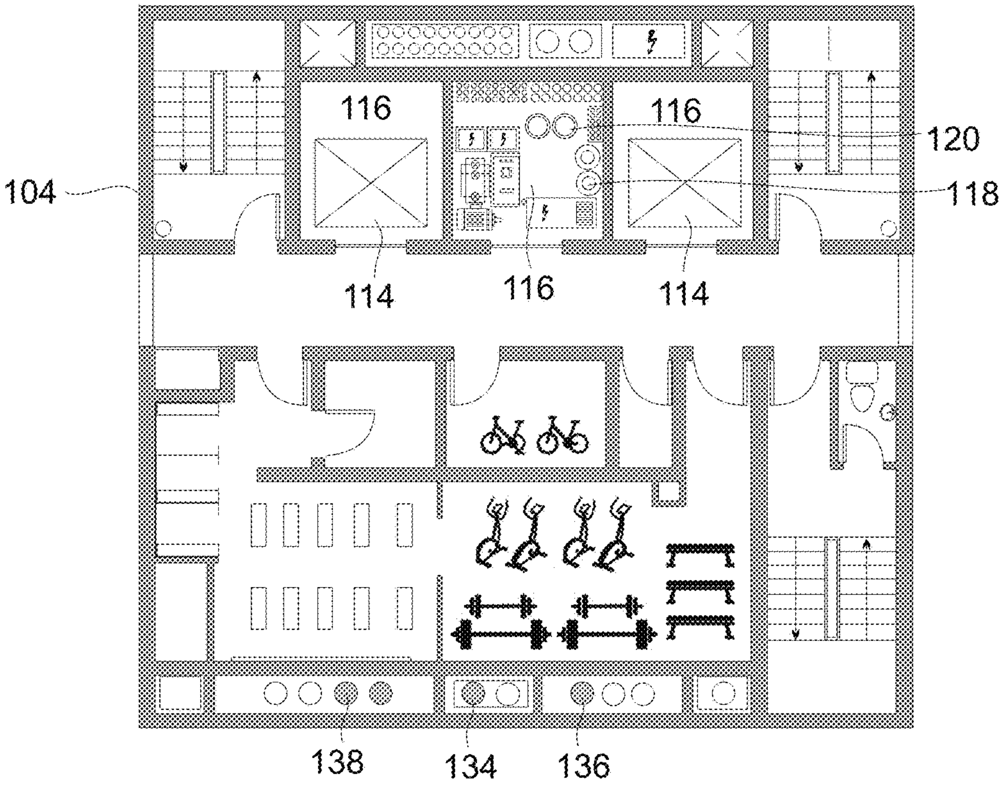
FIG. 2B is a plan view of an inner core of residential building floor following retrofitting of the office floor.

A blow-up of inner core 104 of FIG. 1B is provided in FIG. 2B, in which further details are portrayed. The inner core 104 of the repurposed residential building houses three elevator shafts 116, two of which house functioning remining elevators 114. In this embodiment, the center elevator shaft 116 no longer comprises an elevator and instead houses at least one augmenting vertical fresh water pipe 118 and/or waste water pipe 120.

Figure 3:
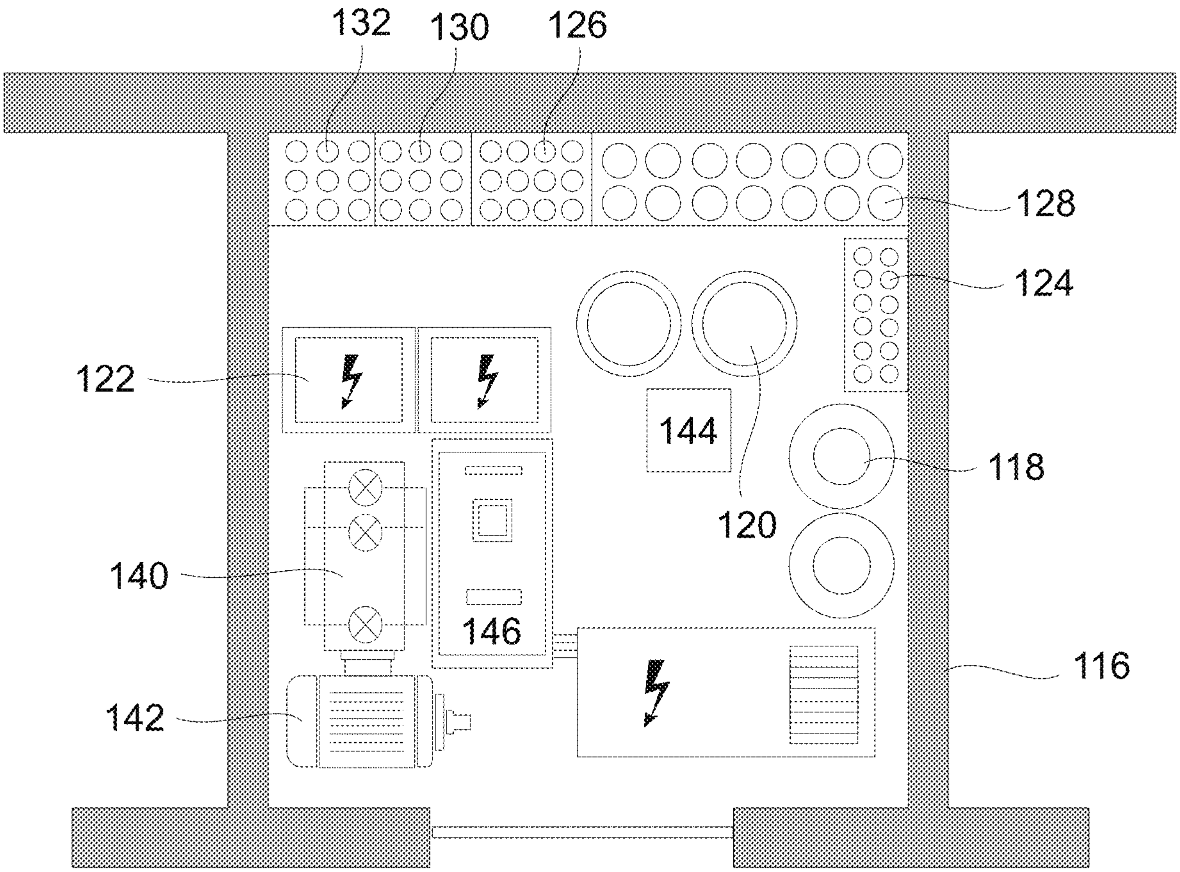
FIG. 3 is a plan view of a repurposed elevator shaft which has been adapted to include fresh-water supply lines, waste-water supply lines and optional additional installations according to embodiments of the invention.

A blow-up of the repurposed elevator shaft 116 of FIG. 2B is provided in FIG. 3. Optionally, the repurposed elevator shaft 116 also houses at least one of augmenting electrical cables 122, augmenting communication/data cables 124, augmenting air conditioning pipes 126, augmenting air ventilation pipes 128, augmenting waste water ventilation pipe 130 and augmenting air tunnel 132. In one embodiment, the augmenting electrical cables 122 and augmenting communication/data 124 are located in isolated compartments inside shaft 116.

Depending on the size of the building and the number of individual residential units, additional augmenting fresh water pipes and/or additional augmenting waste water pipes may be added to an existing shaft of the inner core (other than the repurposed elevator shaft). For example, additional augmenting fresh water pipe 134, additional augmenting waste water pipe 136 and additional augmenting waste water pipe 138 may be placed inside existing shafts 138 of the inner core 104, as illustrated in FIG. 2B. It will be appreciated, that any augmenting installation may be added to existing shaft 138 and elevator shaft 116, and the figures provided are for illustrative purposes only.

The vertical fresh water pipe 118 are designed with appropriate diameter and material, such as copper or PEX piping, to handle increased water demand and pressure requirements. Water supply pumps 140 are installed to maintain adequate water pressure throughout the building, especially on upper floors. These pumps are equipped with variable frequency drives 142 to optimize energy consumption by adjusting pump speed based on real-time demand.

The schedule of the remaining elevators 114 may be adjusted using improved scheduling software 146 to compensate for the repurposed elevator shaft 116. The software may employ algorithms that optimize elevator dispatching based on real-time demand and traffic patterns, reducing wait times and maintaining efficient vertical transportation within the building 100. This ensures that residents experience minimal inconvenience despite the reduction in the number of operational elevators.

As depicted in FIG. 3, the elevator shaft 116 also houses wastewater vent pipes 130. These may extend to the rooftop of the building equipped with venting mechanisms such as air admittance valves and backflow prevention devices to facilitate proper ventilation and prevent negative pressure in the drainage system. The elevator shaft 116 may further accommodate components of the air conditioning system 126, including ducts, refrigerant lines, and air handling units. These components may be integrated with the building's HVAC system, allowing for centralized climate control. Energy-efficient technologies, including variable refrigerant flow systems and inverter-driven compressors, are employed to reduce energy consumption. Air purification units featuring HEPA filters and UV sterilization, are incorporated to improve indoor air quality for residents. Additional electrical power lines 122 may be routed through the elevator shaft 116 to meet increased power demands associated with residential use. These include dedicated circuits for high-demand appliances like electric stoves and HVAC equipment. The electrical infrastructure is designed with provisions for future capacity expansion, ensuring the building can accommodate technological advancements and increased energy needs.

Communication cables 124, including fiber optic cables for high-speed internet and provisions for smart home integrations, may also installed within the elevator shaft 116. This supports an integrated building management system, enabling features like remote monitoring, energy management, and enhanced security controls within residential units 102.

Structural reinforcements may be added to the elevator shaft 116 to support the additional systems and ensure structural integrity. These reinforcements may include steel beams, brackets, and load-distribution plates designed by structural engineers to meet safety standards. The elevator shaft is modified to handle the increased loads without compromising the building's structural integrity, maintaining compliance with building codes and regulations.

Repurposed elevator shaft 116 may be with thermal and acoustic materials to prevent heat transfer and sound transmission between installed systems and residential units 102. This insulation contributes to energy efficiency by reducing heating and cooling losses.

Access points may be incorporated on each floor 100 within the elevator shaft 116 to facilitate maintenance of the installed systems. Secure, fire-rated doors may be used provide authorized personnel with safe access while maintaining the shaft's integrity and security. This design ensures that routine maintenance and emergency repairs can be conducted efficiently without significant disruption to residents, promoting longevity and reliability of the systems.

Backup power systems such as uninterruptible power supplies and emergency generators, may be installed to ensure continuous operation of critical systems like water supply pumps 140, wastewater pumps 144, monitoring equipment and communication infrastructure during power outages. These backup systems may be integrated with renewable energy sources, including rooftop solar panels and battery storage units, to enhance sustainability and reduce reliance on the grid.

The present invention also aims to overcome a critical architectural and engineering challenge encountered during the conversion of older buildings—particularly office or commercial structures—into modern residential spaces. Specifically, the invention addresses the difficulty of efficiently draining wastewater from bathrooms and toilets that are located at a distance from the building's inner core, where the main vertical wastewater pipe has been repositioned within the elevator shaft.

In traditional gravity-based drainage systems, wastewater pipes must be installed at a steep downward angle to ensure proper flow. This requirement becomes problematic when the bathrooms are not directly adjacent to the vertical drainage stack. To maintain the necessary slope for gravity flow, the drainage pipes must be laid at a significant incline, resulting in an elevated underfloor space to accommodate the descending pipework. Consequently, this leads to a raised floor level in the bathroom areas, reducing the available vertical height of the living space and negatively impacting the design flexibility and comfort of the residential units. This problem is depicted in FIG. 4A which illustrates a typical bathroom such as bathroom 200 of a repurposed office building. The bathroom contains toilet 202 and sink 204 connected to drainage pipes 206. Drainage pipes 206 are connected to central waste water pipe 208 which is located in elevator shaft 210, from which the elevator has been removed. The height of the bathroom is depicted by the letter "h". The height of the underfloor piping is depicted by the letter "f".

To resolve this issue, the present invention introduces an innovative drainage system that minimizes the need for steep pipe inclinations. Instead of relying solely on gravity, the system incorporates one or more wastewater collection units installed directly beneath the bathroom floor. These collectors are fluidly connected to mechanical wastewater pumps. The pumps actively transport the accumulated wastewater from the floor-level collectors through smaller-diameter, relatively horizontal piping to the centralized vertical wastewater stack located within the elevator shaft or core infrastructure area.

Figure 4B:
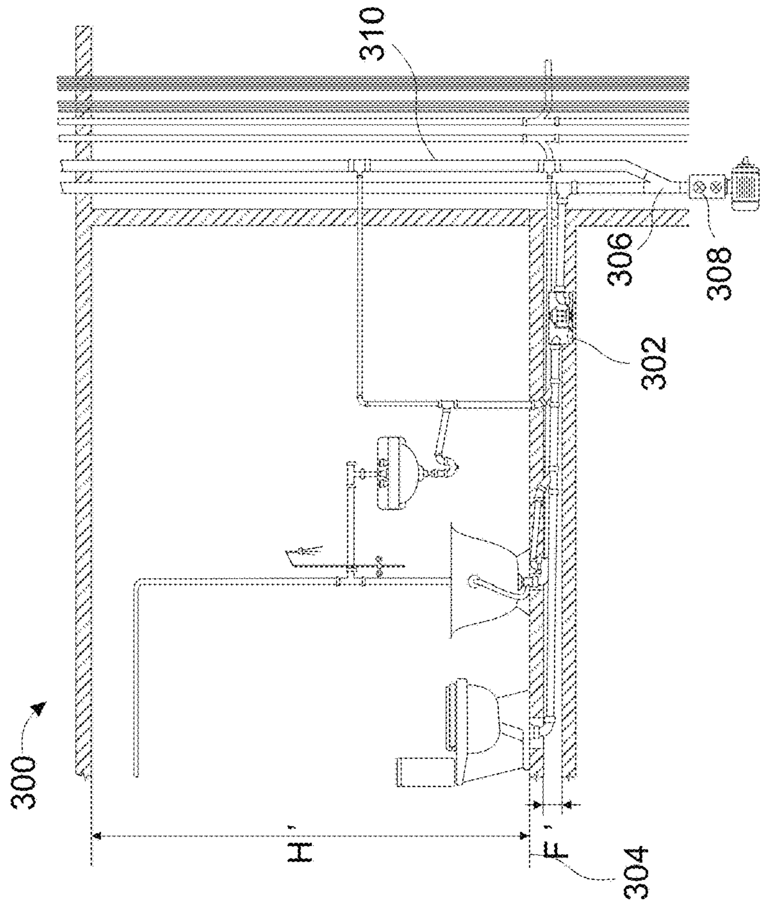
FIG. 4B is a cross-sectional view of a bathroom according to embodiments of the invention. The view shows that if a water collector and a pump are used in combination with the under-floor pipes, the angle at which the pipes are places is less acute, allowing for a lowering of the floor and an increased height of the room.
Figure 4A:
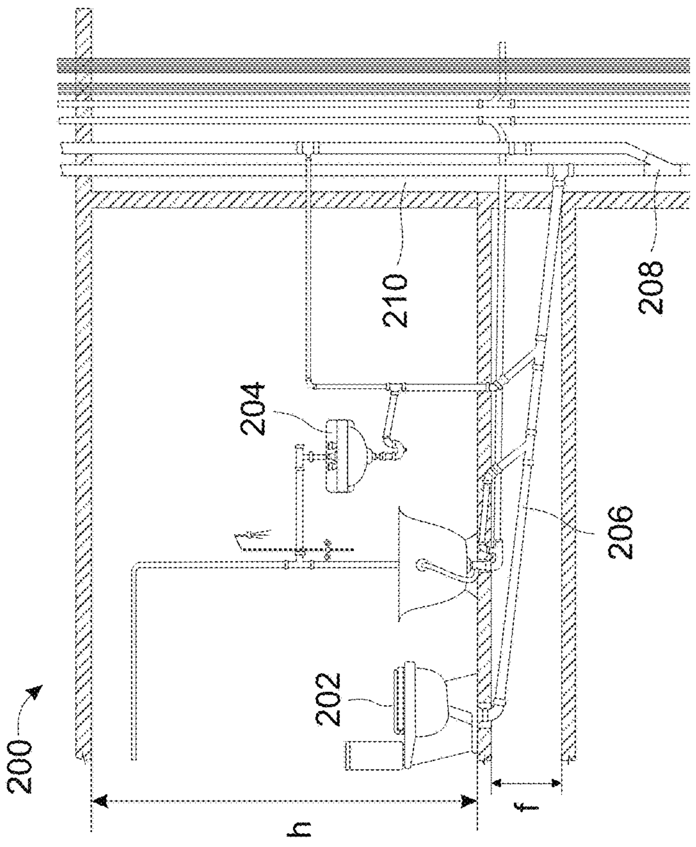
FIG. 4A is a cross-sectional view of a bathroom, showing how under-floor pipes are typically placed in a bathroom. The pipes are laid at an angle that allows water to flow gravitationally from the water source to the central waste-water supply line.

This is depicted in FIG. 4B, which depicts bathroom 300, having a collector 302 positioned beneath bathroom floor 304. As can be seen in FIGS. 4A-B, height of bathroom has been increased from "h" as seen in FIG. 4A to "H'" as seen in FIG. 4B. Underfloor piping height has been reduced from "f" to "F'".

By implementing this pumped drainage solution, the invention significantly reduces the necessary height of the underfloor cavity otherwise required for gravitational drainage pipes. As a result, the finished bathroom floor can be constructed at a lower elevation, thereby increasing the floor-to-ceiling height within the residential unit. This not only enhances the aesthetic and functional quality of the living space but also allows for greater architectural freedom in repurposing commercial buildings into desirable residential environments.

Water collector 302 is designed to ensure consistent water flow and pressure to all fixtures within the units, including kitchens, bathrooms, and laundry facilities.

Wastewater pumps 308 transfer collected wastewater from the floor-level collectors 302 to the vertical wastewater pipes 306, as depicted in FIG. 4B. It will be appreciated that the wastewater pumps 308 can be located at any location so long as they drive wastewater from the collector 302 into the pipes 306. In one embodiment, the wastewater pump is located in the emptied elevator shaft 116 as depicted in FIG. 3—wastewater pump 144, or as depicted in FIG. 4B—waste water pump 308 in elevator shaft 310. In another embodiment, the wastewater pump is located under the floor of the bathroom. Whatever the location, the pumps may also be equipped with variable frequency drives for energy efficiency and noise-dampening features to minimize operational noise. The pumps may be designed for low-noise operation below a predetermined decibel level, contributing to overall residential comfort.

To minimize sound transmission to residential units, noise reduction materials such as acoustic insulation and mass-loaded vinyl barriers, may be applied around the vertical water supply lines, vertical wastewater pipes, and pumps. The insulation materials may be selected for their high sound attenuation properties and fire-resistant characteristics, complying with safety regulations.

Floor-level wastewater collectors 302 may be constructed from antimicrobial materials that inhibit the growth of bacteria and biofilms, enhancing hygiene and reducing maintenance requirements. Odor control systems such as activated carbon filters and air seals, may be integrated into the collectors 302 to prevent unpleasant smells from entering residential units 102.

Office buildings are typically designed to maximize natural light exposure, featuring large windows and facades optimized for sunlight capture. While this design is advantageous for commercial spaces, it can present challenges when the building is converted into residential use. Excessive sunlight can lead to discomfort for residents, causing issues such as overheating, glare, and lack of privacy. Traditional methods of controlling sunlight, such as curtains or interior blinds, may not be sufficient or aesthetically pleasing in a residential context.

Moreover, the facades of modern office buildings offer an opportunity to enhance energy efficiency through the integration of photovoltaic cells. By converting sunlight into electricity, photovoltaic cells can provide a renewable energy source for the building. However, integrating such technology into existing structures without significant structural modifications poses a challenge.

The present inventors therefore propose a method and system that allows residents to effectively control the amount of sunlight entering their units, enhances the building's energy efficiency through the integration of photovoltaic cells, and contributes to the building's aesthetic appeal, all while complying with architectural and regulatory standards.

Figure 5:
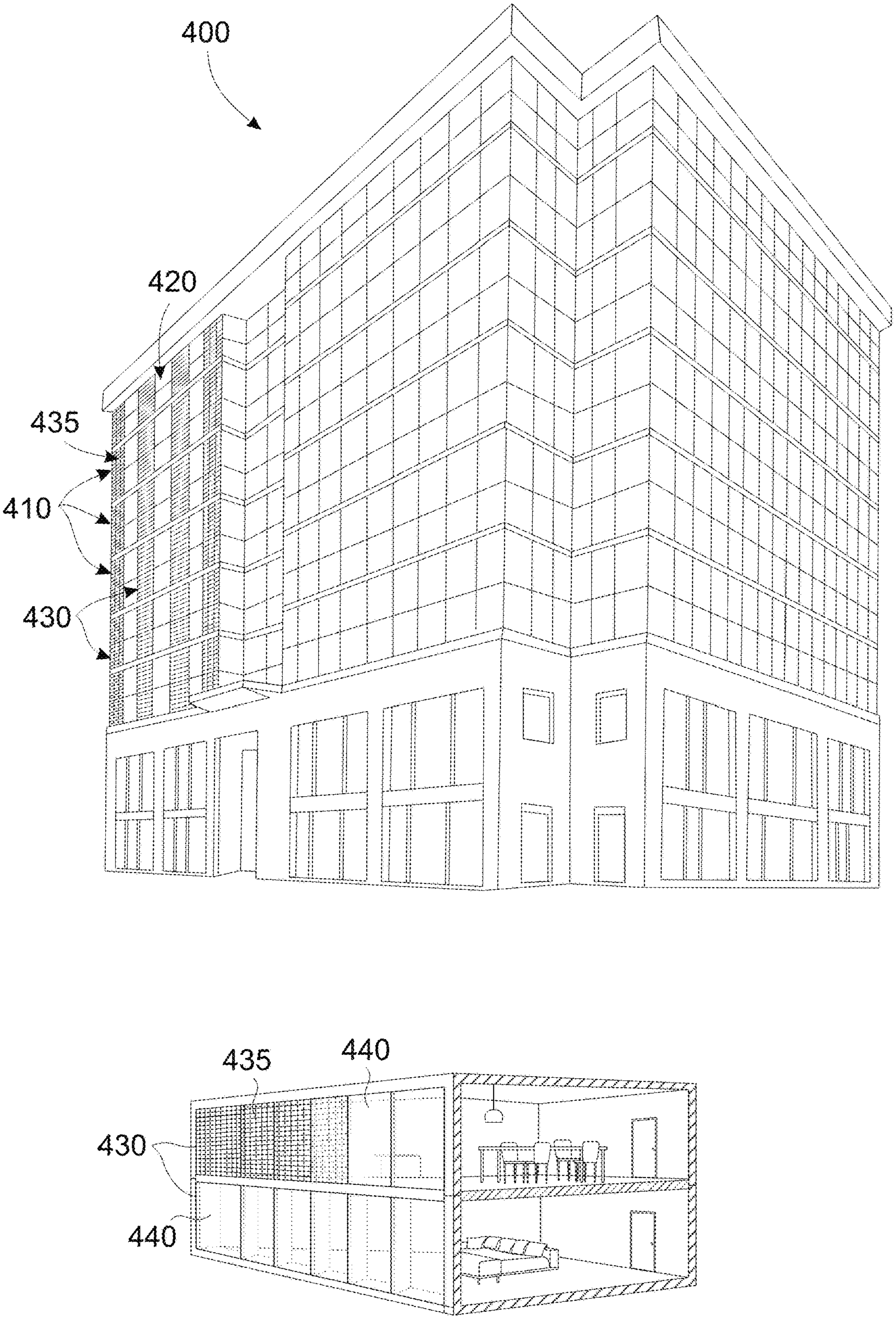
FIG. 5 illustrates a perspective view of a retrofitted residential building with controllable sun-shielding elements integrating photovoltaic cells installed on the façade.

Referring to FIG. 5, an office building 400 converted into residential units 410 features a facade 420 equipped with sun-shielding elements 430 that integrate photovoltaic cells 435. These elements are controllable by occupants of each residential unit to selectively allow or block sunlight entering their respective units while generating electricity to assist in energy supply to the building.

Figure 6:
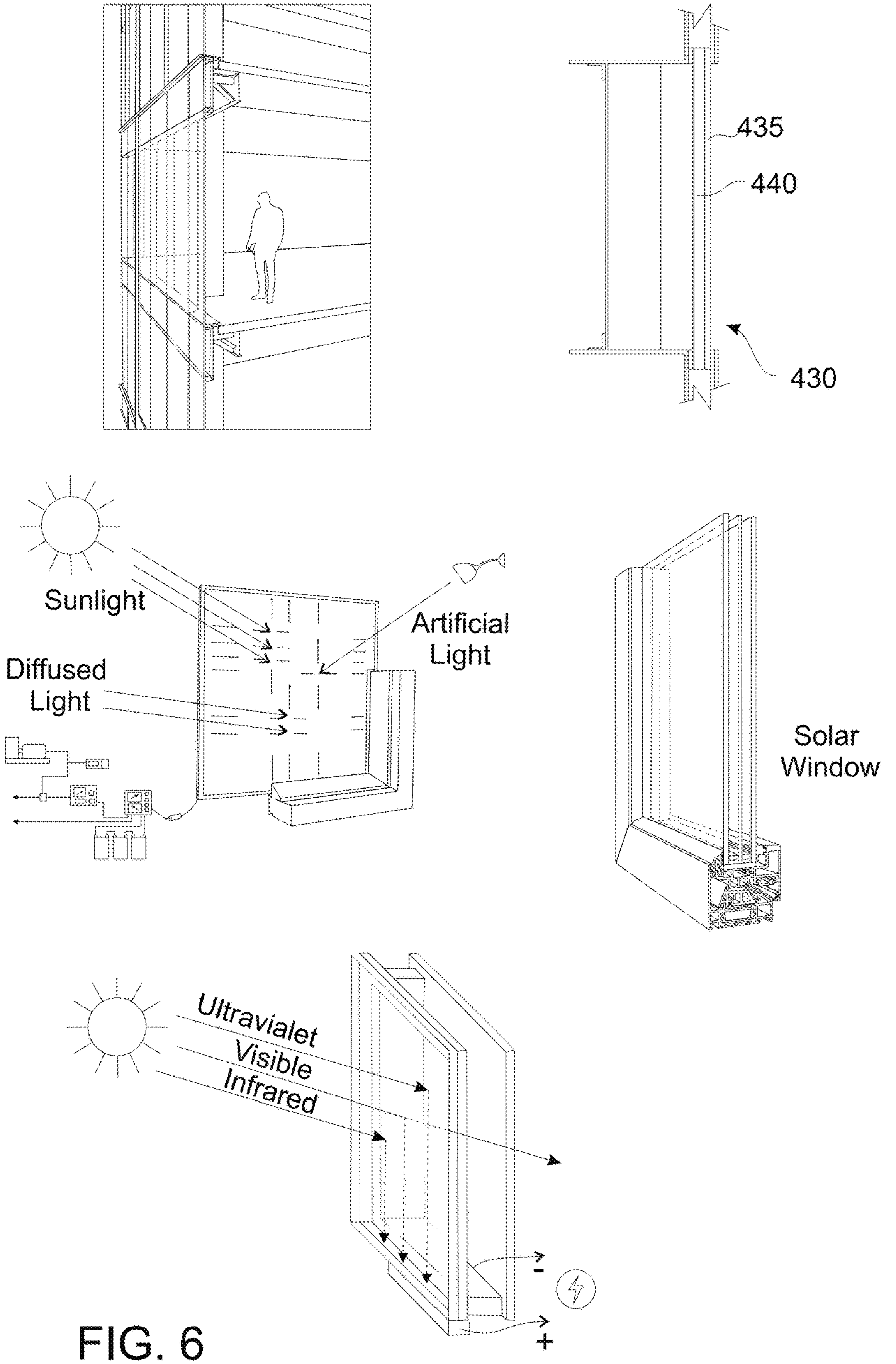
FIG. 6 shows a cross-sectional view of a residential unit with sun-shielding elements comprising darkening glass panels and integrated photovoltaic cells.

In one embodiment shown in FIG. 6, the sun-shielding elements 430 comprise darkening glass panels 440 that adjust transparency in response to control signals from the occupants. The darkening glass panels 440 are made of electrochromic materials that change transparency upon application of an electric voltage. Photovoltaic cells 435 are integrated into or adjacent to these panels, allowing for simultaneous control of sunlight and generation of electricity. The photovoltaic cells 435 can be thin-film solar cells embedded within the glass layers or attached to the exterior surface.

The integration of photovoltaic cells 435 into the sun-shielding elements 430 serves a dual purpose. Firstly, it provides renewable energy generation by converting sunlight into electricity, which can be used to power common areas, reduce the building's overall energy consumption from the grid, or supply energy back to the units. Secondly, the photovoltaic cells 435 act as a shading device, reducing the intensity of sunlight entering the residential units 410, thereby decreasing cooling loads and enhancing occupant comfort.

Alternatively, as depicted in FIG. 8, the sun-shielding elements 430 comprise external shading devices attached to the facade 420. These devices may be adjustable louvers 460 equipped with photovoltaic cells 435 on their surfaces. The adjustable louvers 460 are operable by the occupants through control interfaces 470 within each residential unit 410. The louvers can be rotated or tilted to optimize sunlight blocking and energy generation, depending on the position of the sun and the occupants' preferences.

Figure 7:
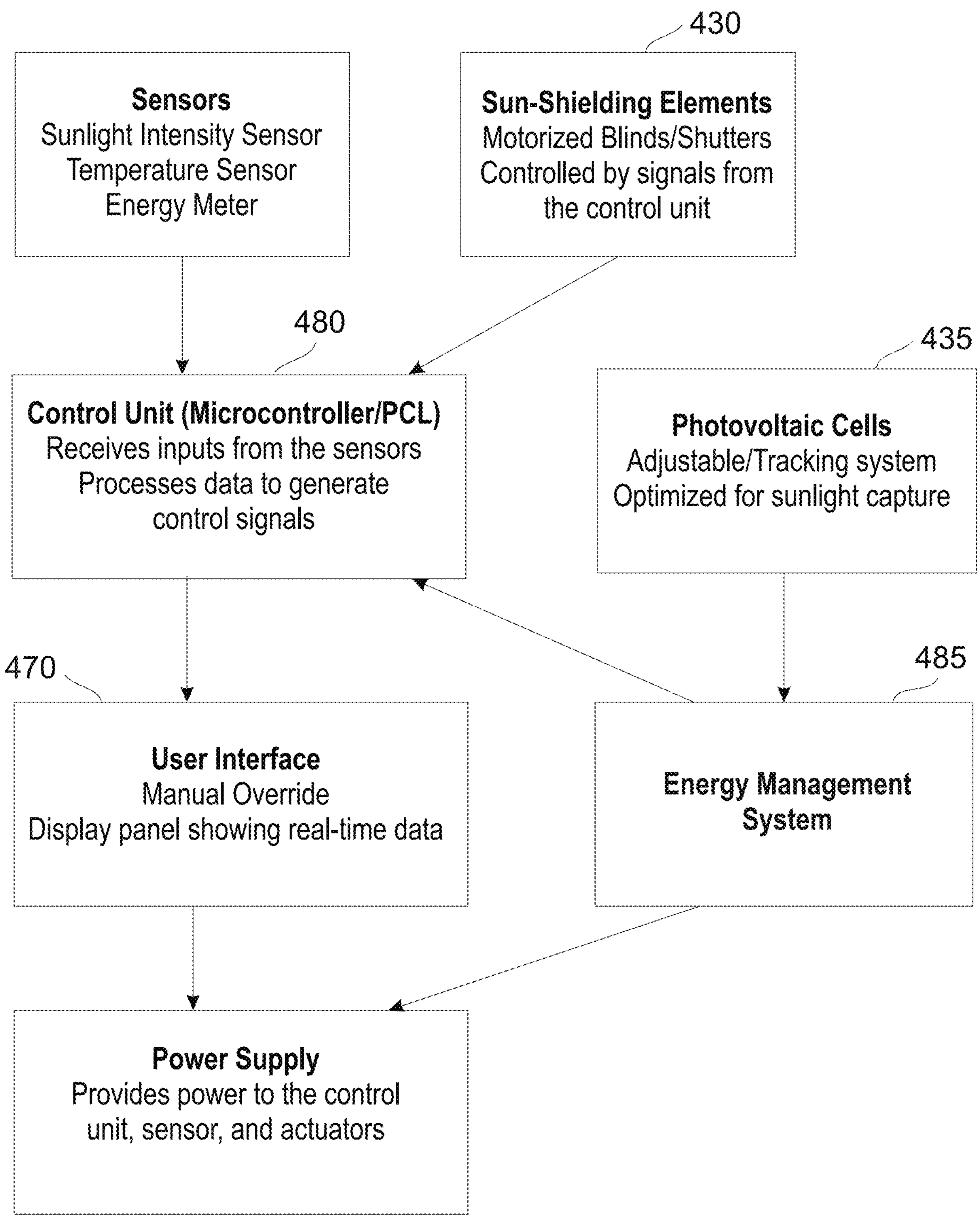
FIG. 7 depicts a block diagram of the control system for the sun-shielding elements and photovoltaic cells within a residential unit.

FIG. 7 illustrates the control system 480 for the sun-shielding elements 430 and integrated photovoltaic cells 435. The system includes individual control interfaces 470 in each residential unit 410, allowing occupants to adjust the sun-shielding elements manually or set automated preferences. The control system 480 is integrated with an energy management system 485 that monitors and manages the electricity generated by the photovoltaic cells 435. This system can allocate the generated energy to specific building functions or feed it back into the grid.

The sun-shielding elements 430 are designed to contribute to the decorative appearance of the building facade 420, enhancing the aesthetic appeal of the building 400. The integration of photovoltaic cells 435 can be aesthetically incorporated into the design, using semi-transparent solar cells or arranging them in patterns that complement the building's architecture. The sun-shielding elements may be customizable in color and pattern for each residential unit 410, allowing for personalization and architectural harmony.

The photovoltaic cells 435 integrated into the sun-shielding elements 430 are made of materials resistant to weathering and ultraviolet radiation, ensuring durability and longevity. They are designed to withstand high wind loads and environmental stress, complying with safety standards and building codes. The electrical connections of the photovoltaic cells 435 are routed through the facade 420 into the building's electrical infrastructure, as shown in FIG. 9.

The sun-shielding elements 430 provide additional thermal insulation, improving the energy efficiency of the building 400 by reducing cooling loads. By blocking excessive sunlight, they reduce the need for air conditioning, while the photovoltaic cells 435 provide renewable energy that can be used to power HVAC systems, lighting, and other electrical loads within the building.

In some embodiments, the sun-shielding elements 430 include smart glass technology responsive to electrical, thermal, or optical stimuli. This technology allows for automatic adjustment of transparency or shading based on environmental factors, enhancing comfort and energy efficiency without occupant intervention. The photovoltaic cells 435 can supply power to the smart glass control systems, creating a self-sustaining unit.

The sun-shielding elements 430 may also include features such as retractable mesh screens or photovoltaic blinds, where the slats of the blinds are made from photovoltaic materials. Integration with the building's climate control system 420 optimizes indoor temperatures and reduces reliance on artificial heating or cooling systems.

Enhanced privacy is provided by the sun-shielding elements 430, which can reduce visibility into the residential units 410 from the exterior. The integration of photovoltaic cells 435 adds an additional layer of privacy by partially obscuring the interior when the cells are positioned over windows.

In case of emergencies, the sun-shielding elements 430 can be integrated with an emergency system to automatically open or adjust, ensuring compliance with safety regulations and facilitating evacuation if necessary. For example, in the event of a fire, the sun-shielding elements 430 can be programmed to retract or become transparent to allow for visibility and access by emergency responders.

Maintenance access to the photovoltaic cells 435 and sun-shielding elements 430 is provided through designed access points or from the interior of the residential units 410. The materials and components are selected for longevity and minimal maintenance requirements.

The integration of photovoltaic cells 435 into the sun-shielding elements 430 enhances the building's sustainability profile, potentially qualifying for green building certifications such as LEED (Leadership in Energy and Environmental Design). The renewable energy generated reduces the building's carbon footprint and operating costs, providing economic and environmental benefits to both the building owners and occupants.

It is to be understood that the present invention is not limited to the embodiments described above but encompasses any and all embodiments within the scope of the following claims. Various modifications to the invention will be apparent to those skilled in the art from the foregoing description. Such modifications are intended to fall within the scope of the appended claims. All publications, patents, and patent applications cited herein are hereby incorporated by reference in their entirety.

The invention has been described in detail with particular reference to certain preferred embodiments thereof, but it will be understood that variations and modifications can be effected within the spirit and scope of the invention. The terms and expressions which have been employed herein are used as terms of description and not of limitation, and there is no intention of excluding equivalents of the features shown and described.

While specific embodiments of the invention have been described, it will be apparent to those skilled in the art that various changes and modifications can be made without departing from the invention's scope. The invention is intended to cover all alternatives, modifications, and equivalents as may be included within the spirit and scope of the invention as defined by the claims.

It should be understood that the foregoing description is only illustrative of the invention. Various alternatives and modifications can be devised by those skilled in the art without departing from the invention. Accordingly, the present invention is intended to embrace all such alternatives, modifications, and variances that fall within the scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method for converting a multi-story office building into a multi-story residential building, said office building having a vertical and continuous internal core, at least a part of or the entire said internal core is load-bearing of the building, said internal core housing:

(i) a plurality of elevators, each in a pre-existing elevator shaft;

(ii) a pre-existing vertical fresh water pipe; and (iii) a pre-existing vertical waste water pipe;

the method comprising:

(a) repurposing at least one said pre-existing elevator shafts in the internal core, by removing at least one said elevators from within said at least one said pre-existing elevator shafts, so as to generate at least one elevator-free elevator shafts, and vertically installing, within said at least one elevator-free elevator shafts at least one installation selected from the group consisting of augmenting vertical fresh water pipes, augmenting vertical waste water pipes, air ventilation pipes and systems, air conditioning pipes, air tunnels and systems, electricity lines and panels, data lines and waste water ventilation pipes, (b) converting a plurality of offices of the office building into a plurality of residential units having its own bathroom located outside said internal core; thereby converting the multi-story office building into a multi-story residential building, wherein the multi-story residential building comprises at least one additional pre-existing elevator shafts in the internal core which houses at least one operational elevator.

2. The method of claim 1, further comprising vertically installing, within an additional pre-existing shaft of said internal core at least one additional said installation.

3. The method of claim 1, wherein said installation comprises augmenting vertical waste water pipes.

4. The method of claim 1, wherein said installation comprises augmenting vertical fresh water pipes.

5. The method of claim 3, further comprising installing a plurality of floor-level wastewater collectors; each said plurality of floor-level wastewater collectors configured for gravitationally collecting wastewater from said residential units of any of said floor levels and transferring said wastewater from the floor-level wastewater collectors to said vertical wastewater pipes by a plurality of pumps.

6. The method of claim 5, wherein said pumps are located in the pre-existing elevator-free elevator shaft.

7. The method of claim 4, further comprising configuring at least one said residential unit on each floor such that water is supplied to the residential unit from a floor-level water distribution system connected to the vertical fresh water pipe in said at least one elevator-free elevator shaft.

8. The method of claim 4, wherein leakage control systems are implemented to detect and contain any leakage from the augmenting fresh water pipes.

9. The method of claim 1, further comprising structurally reinforcing said elevator-free elevator shaft to support the additional systems installed.

10. The method of claim 1, wherein the residential building comprises at least two additional centrally located pre-existing elevator shafts, each housing an operational elevator, which are equipped with scheduling software to reduce wait times due to decrease elevator availability and the converting of the office building.

11. The method of claim 1, wherein at least 80% of the outer façade of the building is fabricated from glass.

12. The method of claim 1, wherein the multi-story building is at least five stories high.

13. The method of claim 1, wherein a floor area of the building is greater than 300 square meters.

14. The method of claim 1, wherein a floor area of the building is greater than 1,000 square meters.

15. The method of claim 1, further comprising installing sun-shielding elements on the facade of the building, wherein the sun-shielding elements are controllable by occupants of each said residential unit to selectively allow or block sunlight entering their respective units.

16. The method of claim 15, wherein the sun-shielding elements comprise darkening glass panels that adjust transparency in response to control signals from residents of the building.

17. The method of claim 15, wherein the sun-shielding elements comprise blinds installed on the facade, operable to adjust the amount of sunlight entering the residential units.

18. The method of claim 15, further comprising installing individual control interfaces within each said at least one residential unit to operate the sun-shielding elements.

19. The method of claim 15, wherein the sun-shielding elements are installed over pre-existing windows of the building facade.

20. A method for converting a multi-story office building into a multi-story residential building, said office building having a vertical and continuous internal core, at least a part of or the entire said internal core is load-bearing of the building, said internal core housing:

(i) a plurality of elevators, each in a pre-existing elevator shaft;

(ii) a pre-existing vertical fresh water pipe; and (iii) a pre-existing vertical waste water pipe;

the method comprising:

(a) repurposing at least one said pre-existing elevator shafts in the internal core, by removing at least one said elevators from within said at least one said pre-existing elevator shafts, so as to generate at least one elevator-free elevator shafts, and vertically installing, within said at least one elevator-free elevator shafts at least one augmenting fresh water pipe, wherein the multi-story residential building comprises at least one additional pre-existing elevator shafts in the internal core which houses at least one operational elevator, wherein a majority of floors of the office building are converted into a plurality of residential units; and (b) installing within said at least one elevator-free elevator shaft and/or said additional pre-existing shaft at least one installation selected from the group consisting of air ventilation pipes and systems, air conditioning pipes, air tunnels and systems, electricity lines and panels, data lines and waste water ventilation pipes; and (c) converting a majority of floors of the office building into a plurality of residential units; thereby converting the multi-story office building into a multi-story residential building, wherein the multi-story residential building comprises at least one additional pre-existing elevator shafts in the internal core which houses at least one operational elevator.

* * * * *